US005700149A

United States Patent [19]
Johnson, III et al.

[11] Patent Number: 5,700,149
[45] Date of Patent: Dec. 23, 1997

[54] METHOD OF PERSONAL VERIFICATION FOR AN IN-RESIDENT SYSTEM FOR ADMINISTRATING COURSE MATERIAL

[76] Inventors: Oscar R. Johnson, III, 3100 Jeanetta #1406, Houston, Tex. 77063; Marschall S. Owens, 8607 Shadowcrest, Houston, Tex. 77074

[21] Appl. No.: 254,086

[22] Filed: Jun. 3, 1994

[51] Int. Cl.$^6$ ............................................. G09B 7/00
[52] U.S. Cl. .................. 434/322; 434/350; 434/362
[58] Field of Search ............................ 434/169, 322, 434/323, 336, 350, 362; 380/23, 25

[56] References Cited

U.S. PATENT DOCUMENTS

| | | |
|---|---|---|
| 3,999,307 | 12/1976 | Tsuda et al. . |
| 4,219,151 | 8/1980 | Haruki .................. 380/25 |
| 4,427,279 | 1/1984 | Edelstein et al. .............. 354/107 |
| 4,430,728 | 2/1984 | Beitel et al. .................. 380/25 |
| 4,468,204 | 8/1984 | Scott et al. . |
| 4,518,361 | 5/1985 | Conway . |
| 4,609,358 | 9/1986 | Sangster . |
| 4,625,244 | 11/1986 | Chong et al. . |
| 4,634,386 | 1/1987 | Tamaki . |
| 4,636,174 | 1/1987 | Andersen et al. . |
| 4,715,818 | 12/1987 | Shapiro et al. . |
| 4,750,888 | 6/1988 | Allard et al. . |
| 4,764,120 | 8/1988 | Griffin et al. ................ 434/336 |
| 4,785,472 | 11/1988 | Shapiro . |
| 4,804,328 | 2/1989 | Barrabee . |
| 4,847,700 | 7/1989 | Freeman . |
| 4,877,408 | 10/1989 | Hartsfield . |
| 4,907,146 | 3/1990 | Caporali . |
| 4,967,354 | 10/1990 | Buchanan . |
| 5,002,491 | 3/1991 | Abrahamson et al. . |
| 5,176,520 | 1/1993 | Hamilton . |
| 5,180,309 | 1/1993 | Egnor . |
| 5,195,033 | 3/1993 | Samph et al. . |
| 5,204,813 | 4/1993 | Samph et al. . |
| 5,211,564 | 5/1993 | Martinez et al. . |
| 5,219,291 | 6/1993 | Fong et al. . |
| 5,241,600 | 8/1993 | Hillis ........................... 380/23 |
| 5,422,959 | 6/1995 | Lee .............................. 382/119 |
| 5,458,494 | 10/1995 | Krohn et al. ................. 434/169 |
| 5,489,213 | 2/1996 | Makipaa ...................... 434/322 |

*Primary Examiner*—Jeanne M. Clark
*Attorney, Agent, or Firm*—Sue Z. Shaper; Butler & Binion, L.L.P.

[57] ABSTRACT

An in-resident system for administering a course of study using a central data processor having access to a program and using residential/business scale equipment including a terminal and screen that can communicate with the program or a portion of the program, at a remote in-resident location and time the system including a method for personal validation of the remote student and for administering the course of study remotely.

16 Claims, 10 Drawing Sheets

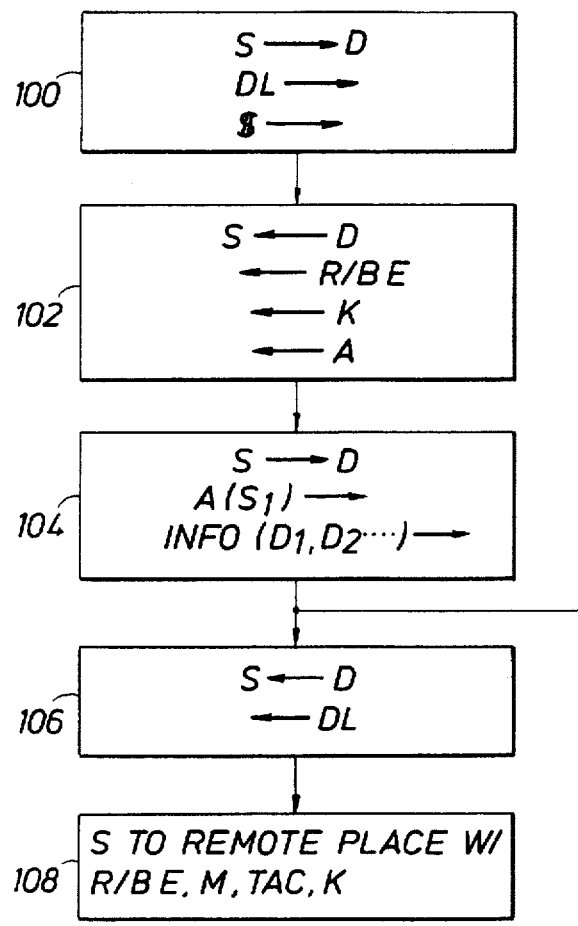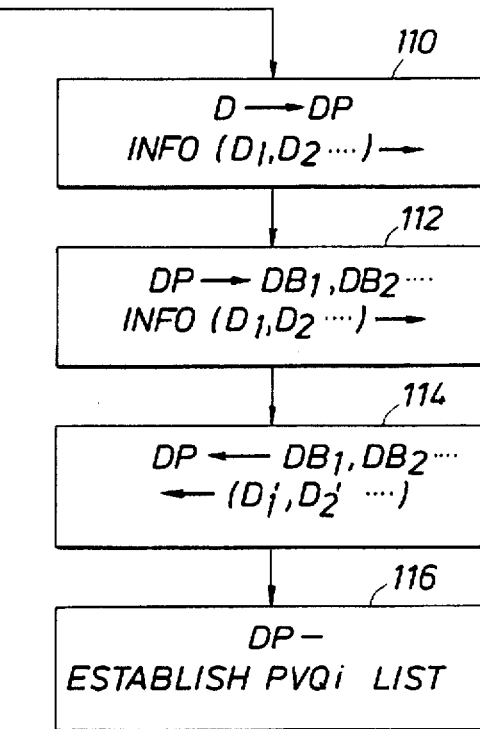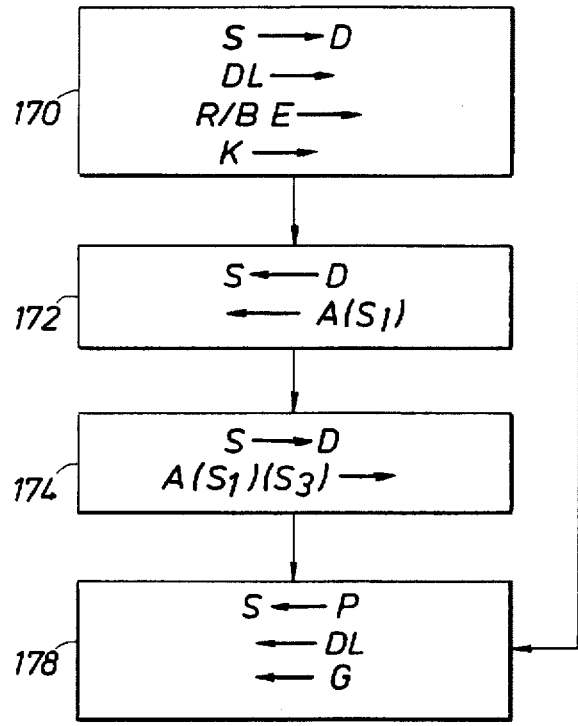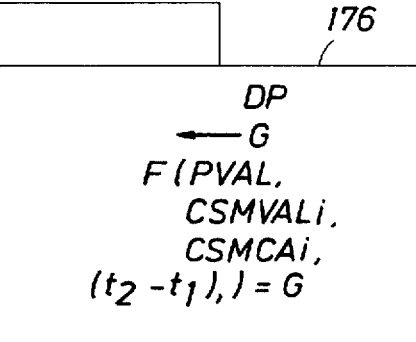
FIG. 5
FIG. 7

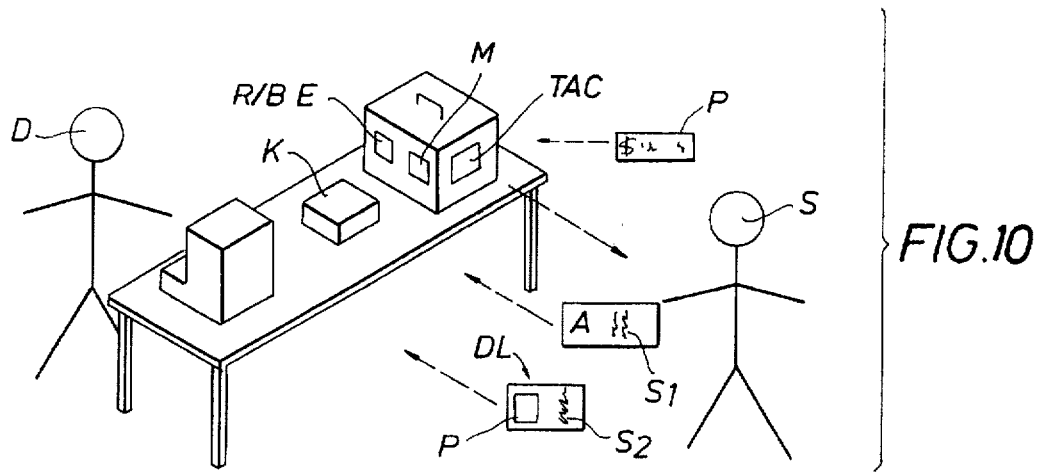
FIG.10
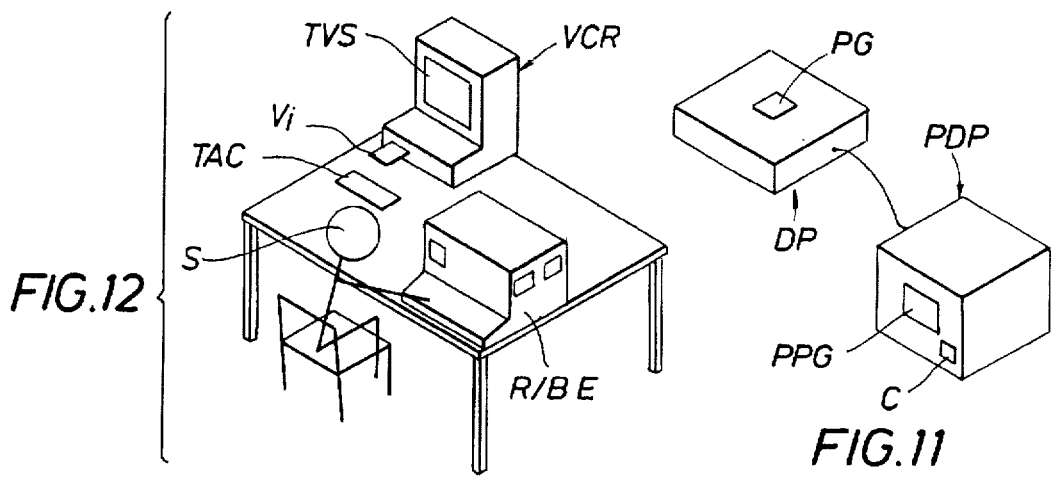
FIG.12
FIG.11
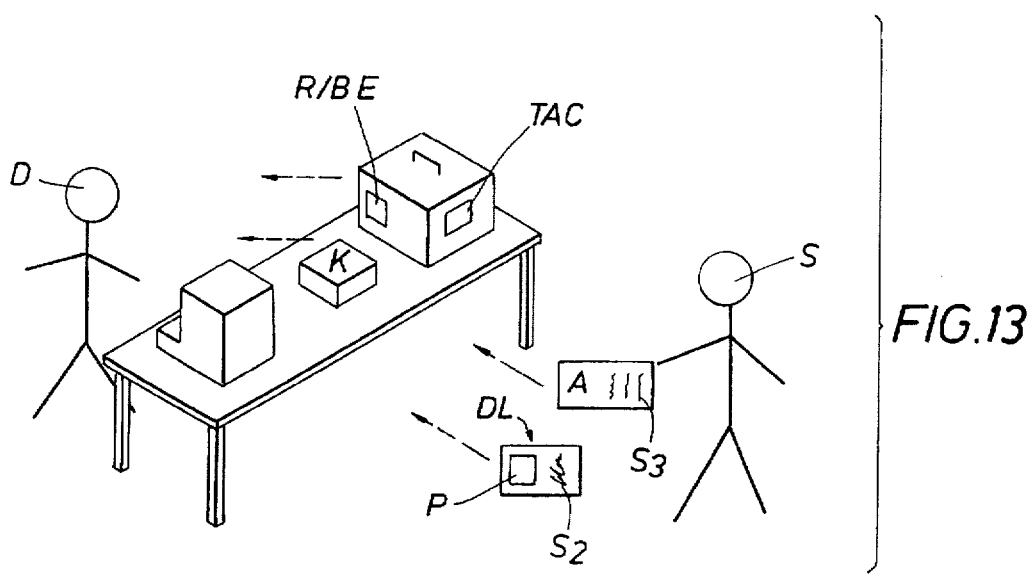
FIG.13

METHOD OF PERSONAL VERIFICATION FOR AN IN-RESIDENT SYSTEM FOR ADMINISTRATING COURSE MATERIAL

BACKGROUND OF THE INVENTION

1. Field of the Invention

This invention relates to a system for remotely administering a course of study, and more particularly, the invention discloses an in-resident system for interactively teaching and testing a course of study and for validating a remote student.

2. Prior Art

The inspiration for the development of the present system stemmed from the Driver-Safety Programs as currently administered in the various states throughout the United States. According to current practice, students are required to be present in classrooms for multiple hour sessions of instruction and testing. As a result of the imposed physical and temporal constraints, the courses are frequently perceived as a punishment, to be endured in exchange for lower insurance rates or court dismissal of traffic tickets. Such attitudes constitute a hinderance to genuine education.

The present invention, an in-residence system for teaching and testing course material, was developed to offer a convenient and entertaining alternative to the consumer/student. A more pleasant and relaxed environment, devoid of many of the perceived oppressing physical and time constraints, is believed to be conducive to genuine education and, more importantly, to the retention of learned material. Thus, the system of the present invention offers more than just convenience, and more than just a congenial atmosphere; it promises to be more effective.

SUMMARY OF THE INVENTION

The in-residence system for teaching and testing course material comprises a system for administering a course of study, including the testing of subject matter comprehension and remote student identity validation. The system includes a central data processor having access to a program have a plurality of questions. Preferably the system has access to a formula for grading, although grading could be performed by hand. The questions comprise course subject matter questions and at least one personal validation question. Preferably the system includes multiple questions in each category, allowing for a random selection of a subset of questions for any one student. The course subject matter questions may include, in turn, subject matter validation questions as well as subject matter comprehension questions.

The system provides for the use of residential/business scale equipment remote from the data processor, the equipment including a terminal, a display screen, and means for communicating between the program and the terminal/screen. Such communication might involve a phone line. The program may be remote from the equipment, as for instance hosted in the central data processor. Alternately, a copy of the program or portions of the program may be provided at the remote equipment.

The system also includes means for measuring certain elapsed times. In particular, elapsed time is measured between certain communications between the remote terminal/screen and the program and/or between a deaccessing of the program by the terminal/screen and a reaccessing of the program. These elapsed time measurements affect a formula for grading, or at least a grade indicating at least whether the student passes or fails. More particularly, the means for measuring elapsed time may measure the elapsed time between the communication of a personal validation question and the communication of an answer to that question. The formula for grading can provide that such a measured elapsed time greater than a first set amount adversely affects a grade. In fact, such an elapsed time greater than a set amount may fail the student, casting doubt upon personal validity. This student would be required to take the course material in a standard classroom environment. The reasoning behind this tactic is that the person who is registered to take the test should know the answer to a personal validation question immediately. An answerer, thus, of a personal validation question at a remote in-resident terminal requiring longer than a reasonable amount of time is unlikely to be the correct person.

Typically in the system of the present invention, the course subject matter questions are divided into ordered sets. The system has the capability of measuring the elapsed time between the last communication with respect to a first set and a first communication with respect to a succeeding set. A formula for grading can adversely affect the grade if this lapsed time is not greater than a certain set amount, namely, the time required to view the course material, such as on a supplied video. The system can also, or alternately, provide that this elapsed time must be greater than a certain amount in order for the student even to be able to proceed to answer the questions of the succeeding set. The point behind such a teaching system is to insure that there transpires at least sufficient time between succeeding sets of questions for the student to have viewed the course material on, for example, a video, a disincentive to fast forward through the material.

In certain preferred embodiments, the data processor will comprise a central computer. Phone lines will be used in the communication between the central computer and remote students. The remote student's residential/business scale equipment might comprise a database access terminal suitable for home or office use. French Alcatel, and possible U.S. Video Tel, are sources of such equipment. Alternately, in future embodiments, a home TV may be used as remote equipment. A controller device for such TV might function as a "terminal."

Further, in preferred embodiments, the system not only tests students upon course material but also provides means for interactively teaching the course material, as by using videos played on residential/business scale audio/visual display equipment. Instructions for taking the course and for operating the communication equipment interactively with the video, producing a system where the course material is taught and tested in segments, may be included in the video.

The system includes methods for the personal validation of remote students. This method includes soliciting at least a first datum of information from the student present at the check-out time and place. The system includes communicating with a database to correlate this first datum with at least a second datum of information. One or more questions are formulated based upon the second or more data. The method then comprises communicating personal validation question(s) to a student at a second time and place (home or office presumably), and receiving the answers at the data processor. The answers are compared with the data and a prediction is made as to whether the remote student is the same student present at check-out.

In preferred embodiments, the first datum comprises a drivers license number. The database includes a motor vehicle registration database. The database may also include credit report databases. Preferably, the first datum or data would be correlated with a plurality of second data to formulate a plurality of personal validation questions. The method includes communicating a plurality of personal validation questions to a remote student.

In preferred embodiments, the method may include visually comparing the appearance and signature of a student present at check-out with a drivers license picture and signature. The method may involve also comparing the appearance and signature of a student at check-in time with the picture and signature on a drivers license as well as with the signature on an Agreement signed at check-out time.

The personal validation method may also include soliciting drivers license information from a student present at check-out while holding the card; that is, without permitting the student to have reference to the drivers license while answering.

The invention covers a method for administering and testing of a course of study that includes accessing a data processor by a remote residential/business scale terminal/screen and communicating between the processor and the terminal/screen a set of questions, including a personal validation question and a course subject matter question. Preferably a plurality of course subject matter questions are used, including a subject matter validation question and a subject matter comprehension question. A subject matter validation question is designed to verify that the course material was reviewed. A comprehension question tests understanding.

The method includes measuring an elapsed time between a communication of a personal validation question and an answer to the question. The method may include positioning the questions into ordered sets, accessing the data processor at the beginning of a set and deaccessing the data processor at the end of a set. The data processor may then measure a further elapsed time between a deaccessing at the end of a first set of questions and a reaccessing at the beginning of a succeeding set of questions. The method may further include formulating a grade wherein the first measured elapsed time, above referenced, which exceeds a first set amount may adversely affect the grade. In fact, it may fail the student. A second measured elapsed time, above referenced, which is less than a set amount may also adversely affect the grade. Alternately, or in addition, it may temporarily inhibit the student from proceeding.

In preferred embodiments of the invention the method includes communicating a different question if, after the communication of a first question, the means for communication is disconnected or deaccessed before the communication of the answer. The method of the preferred embodiments may include playing a video containing course material at remote residential/business scale audio/visual display equipment. The video may be played interactively with the communication equipment and the system may include a repetition of the steps of playing the video followed by communicating questions and answers between the data processor and the terminal/screen.

BRIEF DESCRIPTION OF THE DRAWINGS

FIGS. 5, 6, 7, and 8 illustrate, in flow chart fashion, steps for the utilization of embodiments of the apparatus and method of the present system.

FIGS. 10, 11, 12, and 13 present a schematic of a method for administering and carrying out an alternate embodiment of the system for in-resident teaching of course material, including student validation and testing.

DETAILED DESCRIPTION OF THE PREFERRED EMBODIMENTS

Figure 1:
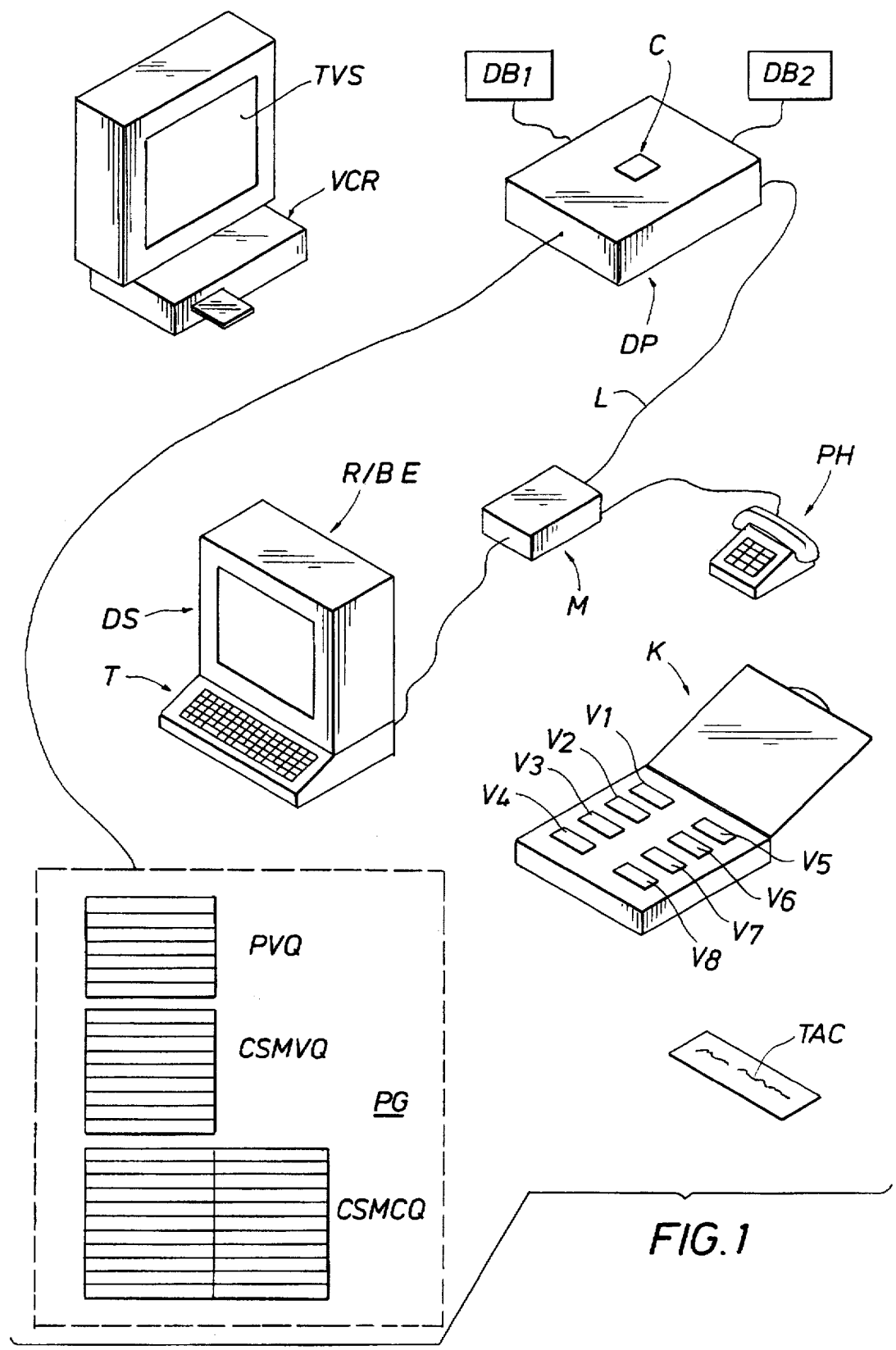
FIG. 1 comprises a schematic of the apparatus of the present invention.

A specific embodiment of the present invention will first be reviewed in general, prior to reference to the figures described above.

As envisioned by one particular embodiment of the invention, a creator and administrator of a driver-safety in-resident course of study will produce and distribute to driver-safety schools, or possibly to commercial retail video stores, an Interactive Driver-Safety Program Kit. The kit would include, for example, two two-hour video tapes, a French Alcatel monitor and terminal and a temporary access card.

The terminal is designed for simple installation, analogous to hooking up an answering machine, and for easy access. The terminal is neither unduly bulky nor heavy and could be enclosed with the two two-hour video tapes in a soft-sided carry bag.

The student, a qualified candidate who takes a driver-safety course for either ticket dismissal or insurance reduction purposes for instance, rents the kit rom an authorized program distributor, such as the driver-safety school or commercial retail video store mentioned above. The qualified candidate hands over a drivers license (or permit with picture I.D.) to the distributor's check-out person. While the check-out person is entering requisite information into a prompt screen, the qualified candidate completes an Enrollment Agreement. The estimated charge for this kit would be less than fifty dollars, plus a deposit.

Duplicate information is required on both the check-out screen and the Enrollment agreement. A first personal validation test, therefore, may comprise whether the candidate can complete the questions in the Enrollment Agreement without the assistance of the candidate's drivers license, which is in the check-out person's possession. Dual signature provisions at the bottom of the Agreement allow for a signature check verification at both check-out and check-in times, against both the document itself and the drivers license.

To initiate the Driver-Safety Program, the candidate takes the kit home (or to office, etc., the phone number for which may be required to be supplied at check-out time). Tape number 1 is inserted into a VCR. Tape number 1 welcomes the person to the program and provides step-by-step hook-up instructions. An ID access card contains an access telephone number to call. The French Alcatel terminal will then come on line.

A program overview briefly discusses the format for which the candidate will be responsible. To be approved for Certificate of Completion in this program, e.g., to get a passing grade, for instance, the candidate may be required to score 70% or higher on the course content testing sections and score 100% on the validation portion of the test. A very brief sample section, immediately followed by one test question, will be displayed to insure proper hook-up.

At any time during the program the candidate may stop the terminal access. To get back into the program, the candidate simply calls the access number and starts the tape to continue the program where it left off.

The course of study is divided into sections. Each section includes video material and a set of questions to be answered. The video and the communication equipment interact.

The qualified candidate will see, at planned intervals, through their terminal screen, validation and content questions. Excessive time taken to answer a personal validation question may adversely affect a grade, even automatically fail the student. Further, at the conclusion of one testing section, the Program may demand an elapsed time equal to the time required to view the next subject matter on the video before displaying the next section's series of questions. This procedure is designed to insure that a candidate cannot fast forward through the tape.

Typical programming and sample times might consist of:

A. Course introduction—10 minutes

B. The Traffic Safety Problem—15 minutes

C. Factors influencing driver performance—30 minutes

D. Traffic Laws and Procedures—30 minutes

E. Special skills for difficult driving environments—30 minutes

F. Physical forces that influence driver control—15 minutes

G. Perceptual skills needed for driving—30 minutes

H. Defensive driving strategies—50 minutes

I. Driving emergencies—50 minutes

J. Occupant restraints and protective equipment—20 minutes

K. Alcohol and traffic safety—50 minutes

L. D.W.I. and D.U.I.—55 minutes

M. Summation

N. Student evaluation

Each section would be followed by one personal validation question, one course validation question, and three course content questions. Optimally, the data processor selects questions randomly from a bank of potential questions.

Once the candidate completes the Driver-Safety Course, the kit must be returned to the distribution outlet from which it was checked out. The student candidate must again present their drivers license to the check-in person. The check-in person enters the candidate's drivers license number into the terminal. The terminal displays all the information on the candidate. While the check-in person is accessing this information, the candidate re-signs the Enrollment Agreement. The check-in person compares the information from the prompt screen to the candidate's drivers license and again visually checks candidate's appearance and signature against the drivers license and Enrollment Agreement. The prompt screen displays pass/fail information to the check-in person. If the candidate passes both the validation portion and the course content sections, the check-in person records a Certificate of Completion Control Number onto an information screen and signs a corresponding Certificate of Completion. If the candidate does not pass the course content section of this program, the candidate will be allowed to take the course over again for another fee. If the candidate fails the validation portion of the program, the candidate will not be allowed to take any portion of the course over again in the in-resident system.

The Program has included within it a multi-faceted validation system to help insure that the qualified candidate is the actual user of the program. In summary, the Program uses the following safeguards:

A. Drivers license/(permit with picture ID) used for facial verification, general information verification and signature verification (using Enrollment Agreement).

B. Enrollment Agreement notifies the qualified candidate what is being agreed to and the penalties that will result from an attempt to circumvent the program.

C. In-resident telephone number verification—this prevents certain locations from acting as clearing houses for information on this program, allows only one user per telephone number and assists in preventing individuals other than the qualified candidate from taking the test.

D. Periodic changing of the temporary access number helps prevent dissemination of information to others.

E. Preliminary validation questions help insure that the qualified candidate is the actual user of the program and the answerer of the succeeding set of subject matter questions. It is proposed to have ten validation questions associated with the program, derived from information obtained from vehicle registration databases and credit reports.

In addition, further validation means are provided:

A. Measuring elapsed time between segments helps insure that the user does not fast forward the tape.

B. Course content validation questions, perhaps 50 of such content validation questions, spaced throughout the program, help insure the actual viewing of the video by the user.

C. Reshuffling questions upon disconnection helps insure that the user cannot use the phone to obtain help from an outside party.

In the foregoing discussion and in the discussion that follows, it should be stressed that the "grade" might be a numerical grade or a pass/fail, or an indication that the test should be taken again under the same or different circumstances. When the term "in-resident" is used, a home or dormitory or office location is indicated.

Referring now to the drawings, FIG. 1 illustrates elements of the apparatus of an embodiment of the present invention and system schematically. The upper left of FIG. 1 indicates a standard residential/commercial scale VCR. On the VCR is a standard location 20 for inserting and playing video tape $V_t$. Also indicated is the viewing screen TVS. Proceeding clockwise to the upper right, a data processor DP is indicated. The system presumes that the data processor DP is located remotely from the VCR equipment. Data processor DP in the preferred embodiment has access to a series of databases indicated in the figure as $DB_1$ and $DB_2$. These databases may be significantly, or entirely, remote from data processor DP. Data processor DP is also indicated as having a clock C such that the data processor can measure elapsed time between certain events in accordance with the system. Data processor DP also has access to a plurality of questions. These questions are indicated in FIG. 1 as the sets comprising PVQ, CSMVQ, and CSMCQ. PVQ stands for personal validation questions. CSMVQ stands for course subject matter validation questions, and CMSCQ stands for course subject matter comprehension questions. The point of personal validation questions is to insure that the person taking the test is the same person as the one that checked out the equipment. The point of the course subject matter validation questions is to insure that the person taking the test actually viewed or reviewed the subject matter. The point of the course subject matter comprehension questions is to insure and measure that the person taking the test comprehended the material viewed. The central portion of FIG. 1 illustrates communication equipment present at the location where the student is taking the test and probably learning the subject matter. This equipment includes residential/business scale equipment for remote communication with the data process or R/B E. This R/B E includes display screen DS and terminal T. Illustrated associated with the communication equipment is modem M linked to phone PH and phone line L. Kit K will be carried to the in-resident location and contains a set of videos for viewing the course material through the VCR. The student in the preferred embodiment will also carry to the in-resident location an access card TAC. The number on the card is used to establish access between the communication equipment R/B E and the remotely located data processor DP.

Figure 2:
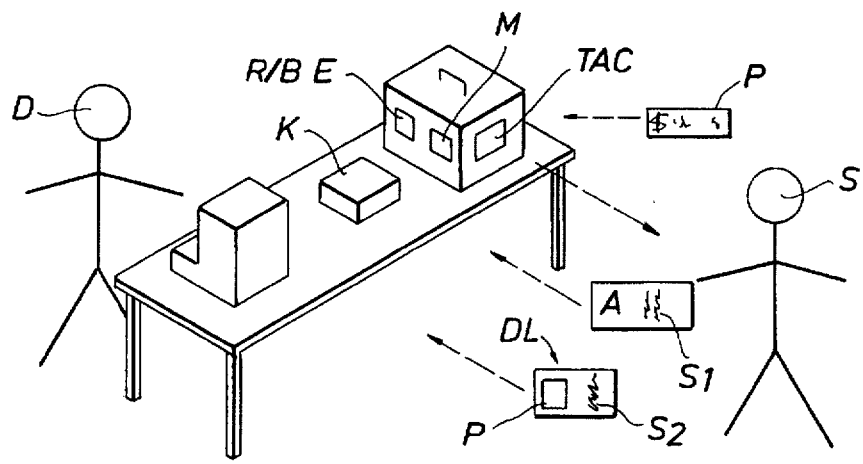
FIGS. 2, 3 and 4 present a schematic of the method for administering and carrying out the system for in-resident reaching of course material, including student validation and testing.
Figure 3:
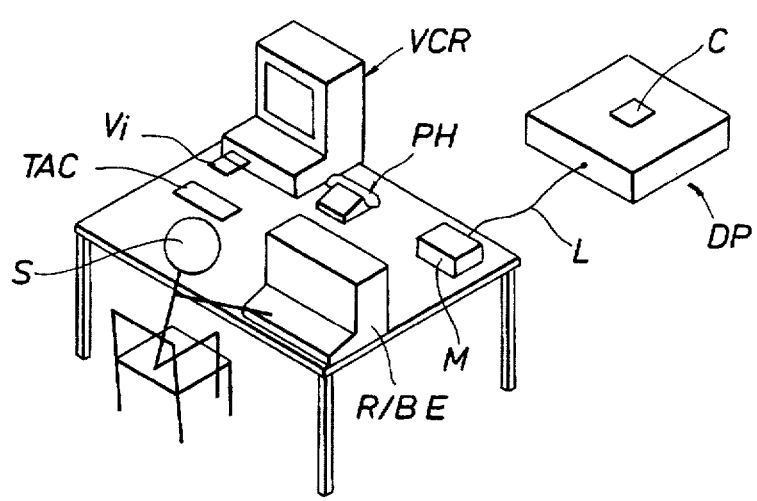
Figure 4:
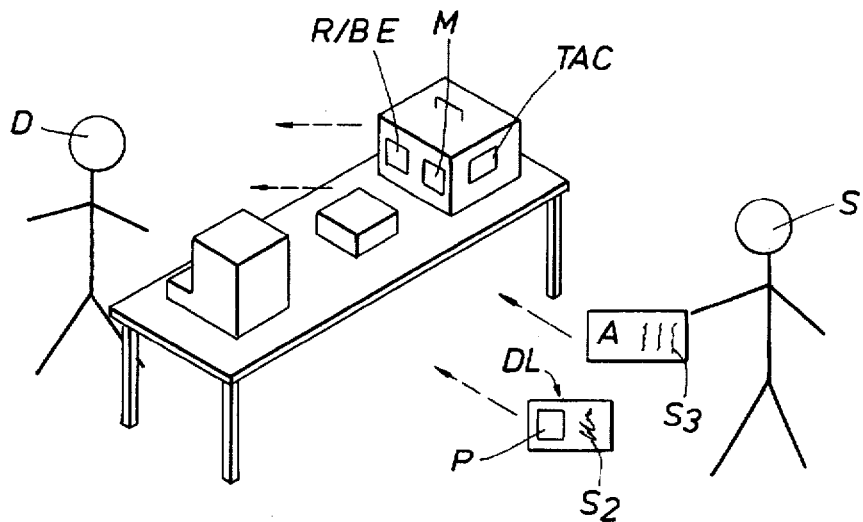

FIGS. 2, 3 and 4 illustrate the system and apparatus in use. FIG. 2 illustrates student S checking out equipment from Distributor D. Student S, in preferred embodiments, signs Agreement A, placing thereon the signature $S_1$. Student S also hands over drivers license DL to distributor D. Drivers license DL will contain picture P and signature $S_2$. Distributor D should compare Picture P with the appearance of student S and signature $S_2$ on the drivers license with signature $S_1$ on the Agreement A. The student also passes over money $ to Distributor D, both as a deposit for the equipment and to pay for the course. The student walks away from the check-out location with communicating equipment R/B E, including modem M and temporary access card TAC, and kit K containing videos with the subject course material. FIG. 3 illustrates student S at an in-resident location, which typically comprises either a home or an office. Student S has set up the communicating equipment R/B E with a typical residential/business phone PH and modem M utilizing phone line L to communicate remotely with data processor DP. Student S at such location also has access to a VCR having a television screen TVS and a place to play videos $V_i$. Student S has carried to this location access card TAC to initiate communication with remotely located data processor DP. With the equipment illustrated in the figure, student S can absorb the course material presented on the videos $V_i$ from kit K and be tested, both as to personal validation, validation of review of subject matter, and comprehension of course material, through using the above described equipment. Instructions for interacting the videos of kit K with the course questions and answers using the communicating equipment and data processor are contained, in the preferred embodiment, on the videos themselves.

FIG. 4 illustrates the student's return of the kit K of videos and communicating equipment R/B E to the distributor D. At this time, according to the system, student S signs agreement A a second time, producing signature $S_3$. Again the student's drivers license with picture P and signature $S_2$ may be passed to distributor D. Distributor D then compares the appearance of the returning student with the picture on the drivers license and the signature of the returning student with the signature on the drivers license and the first signature on the Agreement. In such manner, the distributor validates that the student returning and checking in the equipment is the same student as previously and is the student belonging to the drivers license.

Figure 6:
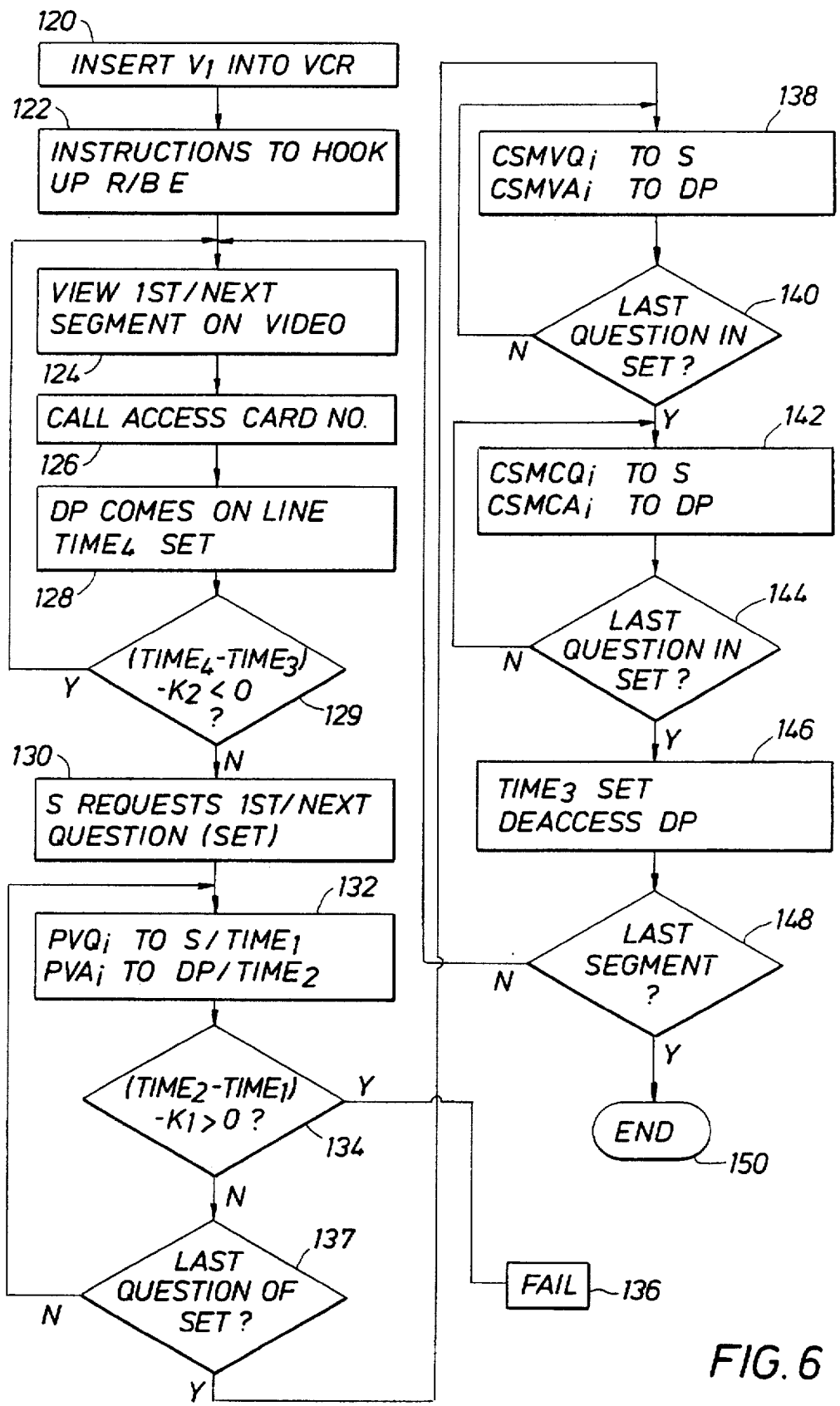

FIGS. 5 and 6 illustrate, in flow chart manner, the method of the present system. FIG. 5, progressing from numbered boxes top to bottom and left to right, indicates in box 100 that student S passes to distributor D both money and drivers license in accordance with the preferred embodiment, box 102 indicates that distributor D passes to student S, in the check-out procedure, communicating equipment comprising residential/business scale equipment having both a terminal and display screen and a kit containing videos for play in a VCR. The videos contain the subject matter of the course material.

Box 104 illustrates that at the check-out location student S passes Agreement A with Signature $S_1$, and information ($D_1$, $D_2$, . . . ) to distributor D. Box 106 indicates that subsequently distributor D passes the drivers license back to student S. Then as indicated in box 108, student S progresses to the chosen remote in-resident location with the communicating equipment R/B E, including modem M and temporary access card TAC, and the kit of videos. Meanwhile, distributor D, as indicated by box 110, communicates with the data processor the information passed from the student to the distributor. This information, in the preferred embodiment, should comprise at least the drivers license number and may comprise more information. The data processor communicates with a series of databases indicated as $DB_1$, $DB_2$ in box 112. The data processor communicates some information $D_1$, $D_2$, etc. learned from the student to the databases. Box 114 indicates that the remote databases communicate back to the data processor a series of datum, indicated as $D_1'$, $D_2'$, etc. that comprise information based upon and related to the person to whom data $D_1$, $D_2$, etc. pertains. From this new data $D_1'$, $D_2'$, etc. the data processor establishes a set of personal validation questions $PVQ_i$, as indicated in box 116.

FIG. 6 indicates the procedure of operations of this system at the remote in-resident location where the subject matter of the test is probably being absorbed and he testing is accomplished. As indicated by box 120, the student inserts the first video $V_1$ into the VCR.

Box 122 indicates that the VCR would display from video $V_1$ instructions to student S as to how to hook up the communication equipment R/B E and otherwise how to proceed through the system, including absorbing the course material from the set of videos and completing the test by means of the communication equipment screen/terminal and a hook-up to a remote data processor DP. Subsequent to absorbing the instructions and completing any actions required thereof, the student S views the first segment of the course material on video $V_1$ and/or any other videos until the first segment of the course material is completed, as indicated by box 124.

In the preferred embodiment, student S then accesses remote processor DP through steps that include calling an access card number, indicated by box 126. The access number is preferably a temporary number, changing every few weeks as a security precaution. The data processor comes on line and notes the time and date and sets $time_4$ of box 128. If the time between the current accessing of the data processor DP and the previous deaccessing of the data processor (the initial sign-off time, $time_3$, being suitably initialized), e.g. ($time_4$-$time_3$), is less than a set amount $K_2$ the system will not proceed. The student should return to view the video, indicated by box 129. If the time window is sufficient, the student requests the first (or next) question set, box 130. A looping procedure is now initiated, indicated in FIG. 6 by boxes 132, 134, and 137. Personal validity questions are supplied to the screen and answered through the terminal until the last personal validity question of the set is answered, in which case the loop is exited. In addition, $time_1$ for asking a personal validation question is recorded. The personal validation answer is communicated from the terminal T to the data processor DP by the student, and $time_2$ for the receipt of the personal validation answer is recorded.

The elapsed time, e.g., $time_2$-$time_1$ between the receipt of the personal validation answer and the posing of personal validation question is compared with some constant $K_1$. If the elapsed time is greater than this constant, it is estimated that the student taking the test is not the same student that supplied the initial drivers license and checked out the test. The student may be deemed to fail the test, or alternately, the student's grade may be otherwise adversely affected. A failed student's recourse will probably be to take the test in an enclosed classroom under supervision. This is indicated by box 136.

Assuming that the elapsed time does not exceed the reasonable time allowed by constant $K_1$, the student loops through all of the personal validation questions, which may be one or more. When the loop of proceeding through box 132, box 134, and box 137 is completed, the student proceeds to loop through a set of course subject matter validation questions, indicated by box 138 and box 140. Subsequent to looping through the questions indicated by box 138 and box 140, the student loops through a set of course subject matter comprehension questions and answers, indicated by box 142 and box 144. At the end of answering the course subject matter comprehension questions, the time is noted, $time_3$ is set, and the student disconnects from or deaccesses the data processor. If the student has completed the last segment of the course, that is the end of the procedure. Otherwise, the student proceeds to view the next segment from the video, indicated by box 124 and to access the data processor DP by calling the access card number, box 126. The data processor DP comes on-line and again notes the time and date. The data processor now compares the elapsed time between answering the last question of the prior segment of questions and the present request to initiate the next segment of questions, e.g., $time_4$-$time_3$. If this elapsed time does not exceed a preset reasonable constant $K_2$, the student is not allowed to proceed, as indicated by box 129. The point of this test is to prohibit the student from proceeding through one set of questions to the next set of questions faster than the student could have viewed the requisite subject matter course material from the video. (The student's grade may also or alternately be affected by short times between accessing segments.) Assuming that the student has allowed sufficient time between answering the last question of the prior segment and seeking to initiate the next segment of questions, the student proceeds through the prepared sets of personal validation questions, course subject matter validation questions and course subject matter comprehension questions. That is, the student proceeds through boxes 130 through 148 until the last segment of the video has been completed.

In regard to the FIG. 7 check-in process, student S returns to the check-out/check-in location and, as indicated by box 170, presents to distributor D the student's drivers license DL, the communication equipment R/B E and the kit of videos K, indicated by box 170. The distributor hands back to the student the same Agreement the student originally signed with signature $S_1$, box 172. The student adds signature $S_3$ and hands the agreement back to the distributor, box 174. The distributor compares the signature $S_3$ with signature $S_1$ and the drivers license signature $S_2$. Assuming that the signatures tally and the picture on the drivers license comports with the appearance of the student, distributor D receives and passes grade G on to student S, as indicated in box 178. The grade comes from data processor DP according to the formula established for grading, as indicated in box 176. Grade G, produced according to formula F, may be based upon the personal validation answers, the course subject matter validation answers, the course subject matter comprehension answers, the time intervals involved in answering personal validation questions and the time intervals between answering sets of questions.

It should be commented that in box 132, box 138 and box 142 of FIG. 6, if communication between the data processor and the student is broken off between a question and an answer, the question subsequently presented will not be the prior unanswered question, but will be a new question which the data processor randomly selects from a bank of suitable questions.

Figure 8:
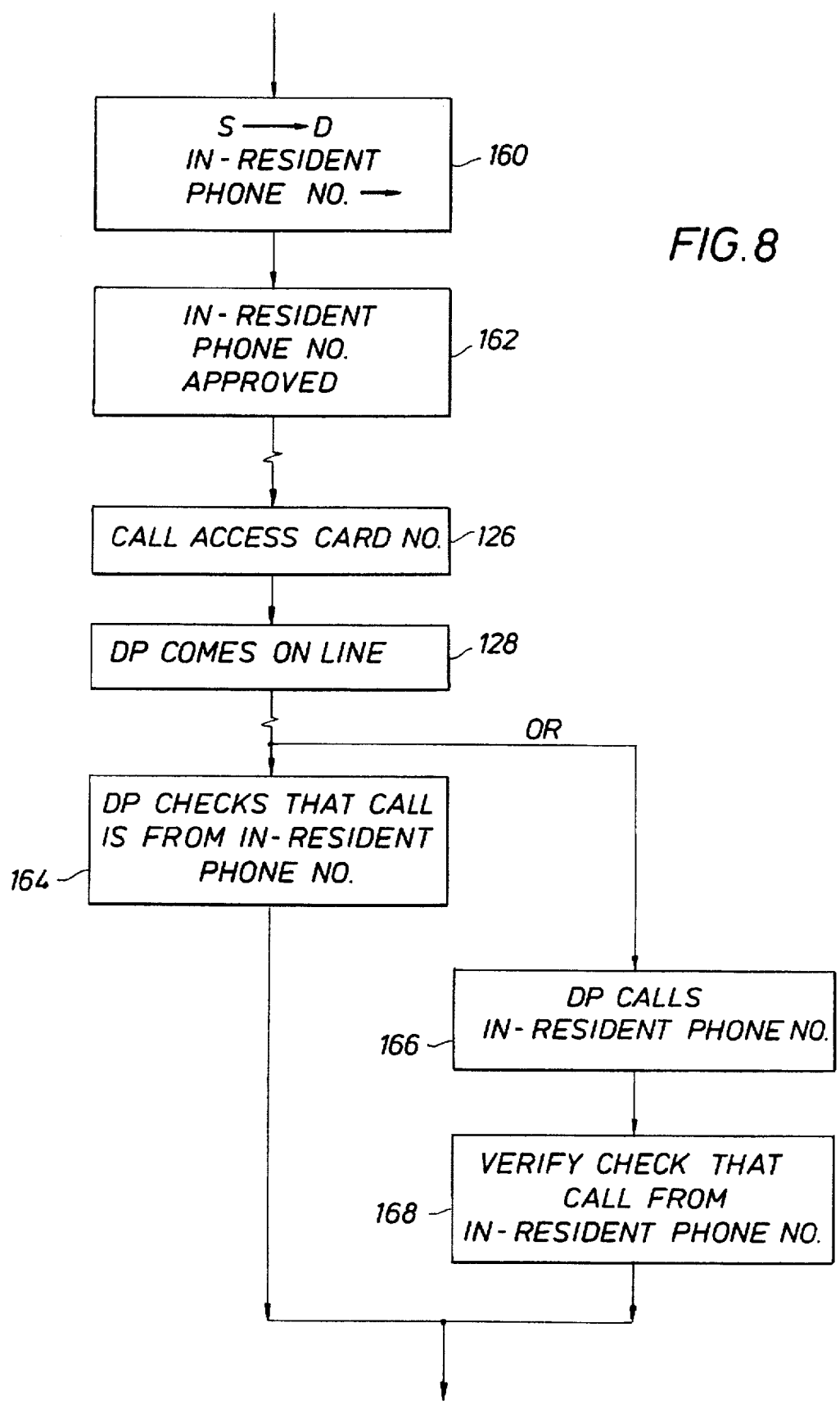

FIG. 8 illustrates a further feature of certain preferred embodiments. Indicated by box 160, at check-out time part of the information delivered by the student to the distributor could be the proposed in-resident phone number to be used at the location where the student candidate will take the test. The distributor, as indicated by box 162, can check the in-resident phone number to guard against certain locations acting as a clearing house for information on the program. The check should allow only one user per telephone number and assist in preventing individuals other than the qualified candidate from taking the test. The materials would only be checked out if the in-resident phone number was approved. Subsequently, after the candidate calls the access card number and the data processor comes on line, indicated by box 126 and box 128, the data processor can verify that the call is coming from the proposed in-resident phone number. Either the data processor can check, using existing technology, the number of the incoming call against the proposed in-resident phone number, indicated by box 164, or the data processor can place a call to the in-resident phone number while the data processor is online with the candidate. A call waiting feature inherent in the commercial/residential scale communication equipment will switch calls between the candidate's incoming call to the data processor and the data processor's recently implemented outgoing call to the in-resident phone number. Noting the simultaneity and the switching between calls can act as a verification that, in all probability, the incoming call has come from the in-resident phone number. This method of checking is indicated by box 166 and box 168 of FIG. 8.

Figure 9:
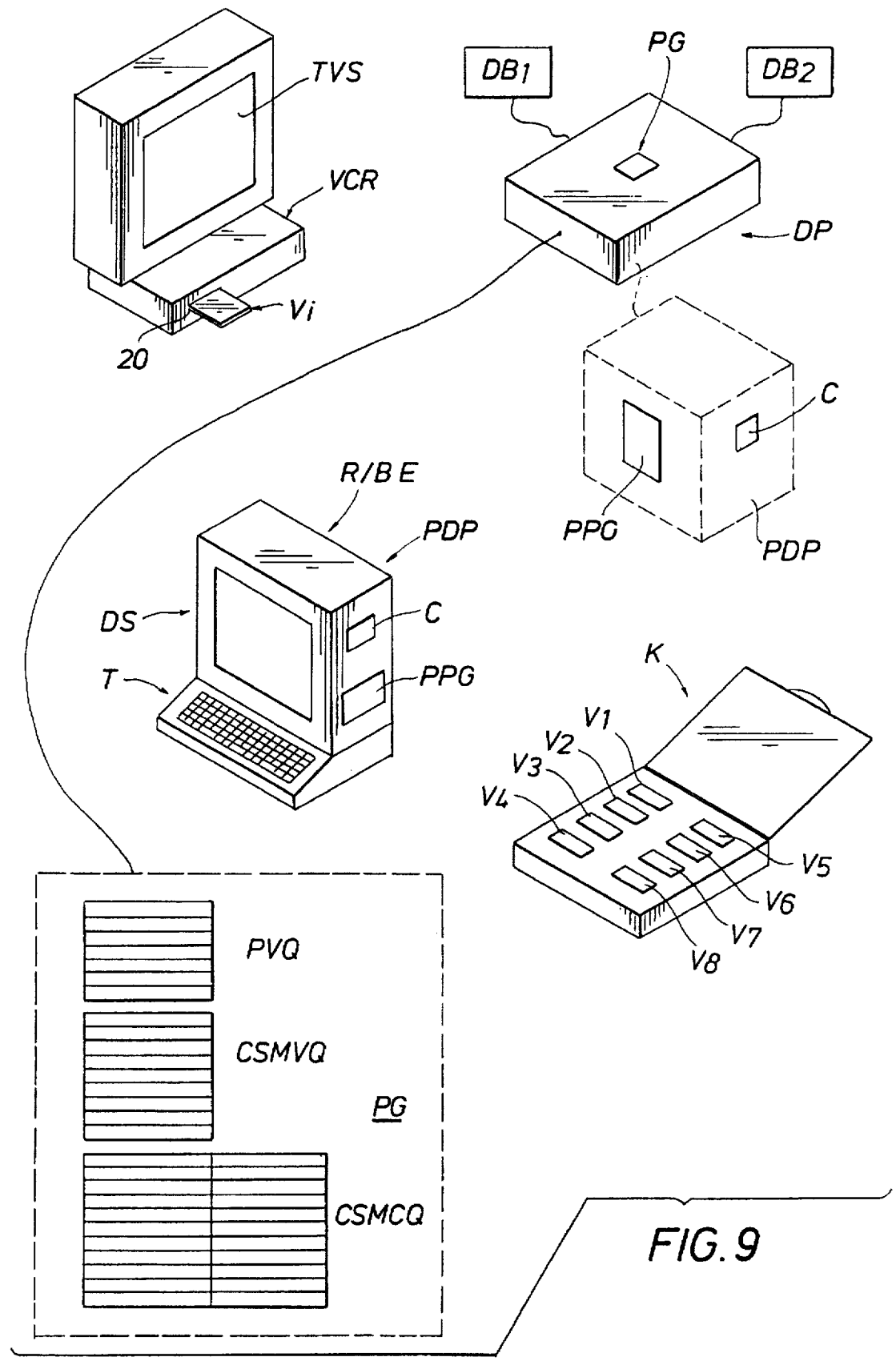
FIGS. 9 and 9A comprise a schematic having an alternate embodiment of the apparatus of the present invention.
Figure 9A:
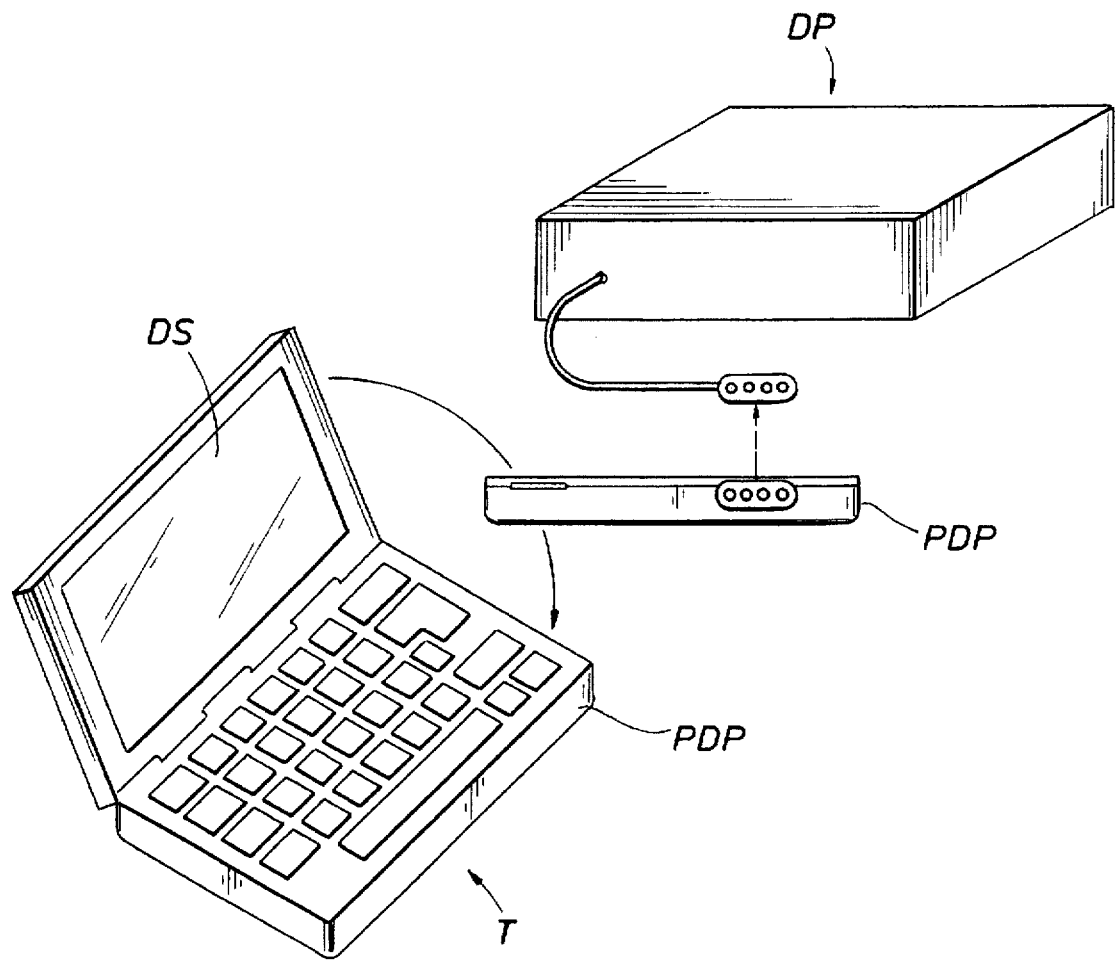

FIGS. 9 through 16 illustrate a related but alternate embodiment of the present invention. In FIG. 9 the residential/business equipment includes a portable data processor POP. At check-out time a portion PPG of program PG is loaded into the portable data processor PDP. This portion PPG of program PG will have embedded in it personal validation questions developed for the candidate in question based upon the information submitted by the candidate at check-out. The portion PPG of program PG will contain a subset, it is envisioned, of the total number of course subject matter questions. With the portable data processor PDP there is no further need for the student to communicate with the central data processor DP during testing. Hence, no temporary access card with phone number, no modem and no phone and phone line is required. The portable data processor PDP contains within it clock C in order to measure elapsed time between various communications. FIG. 9A illustrates how a palm top computer PDP might be utilized, including reference to the means of communication of the palm top data processor with the central data processor DP.

FIGS. 10 through 13 illustrate the difference between this embodiment with the embodiment of FIGS. 2 through 4. In the present alternate embodiment, as illustrated by FIG. 11, the portable data processor PDP receives a portion PPG of program PG of central data processor DP. This portion PPG is located and loaded into portable PDP at check-out time.

As illustrated in FIG. 12, the student has no further need for the phone, modem, or line connecting the in-resident student at a later time with the central computer DP.

Figure 14:
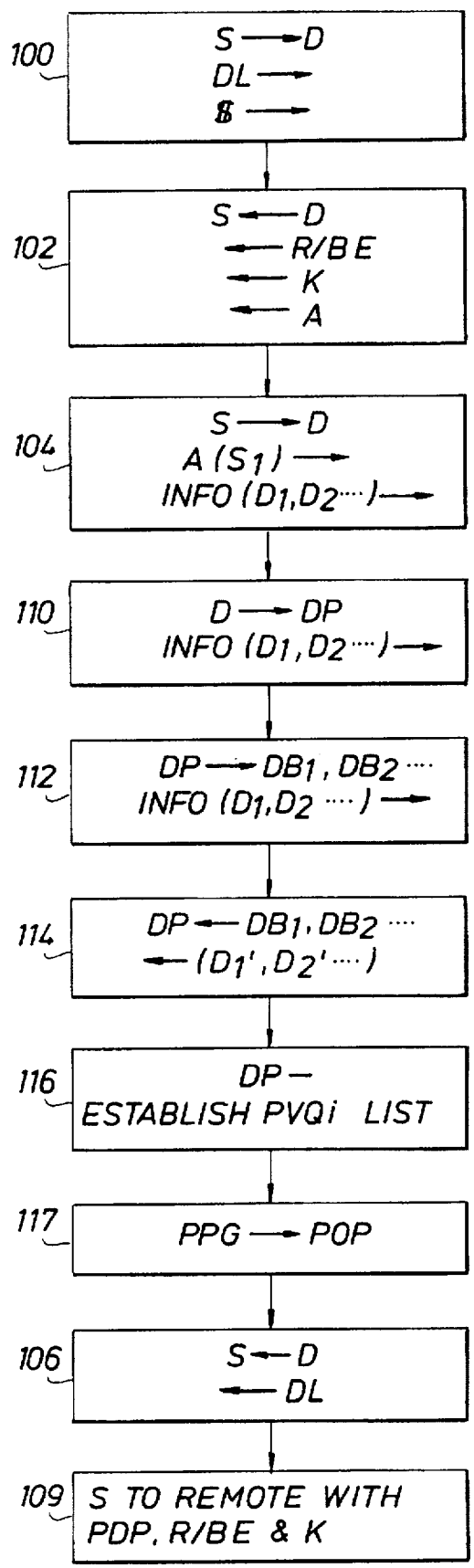
FIGS. 14, 15, and 16 illustrate, in flow chart fashion, steps for the utilization of the alternate embodiment of the apparatus and method of the present system.
Figure 16:
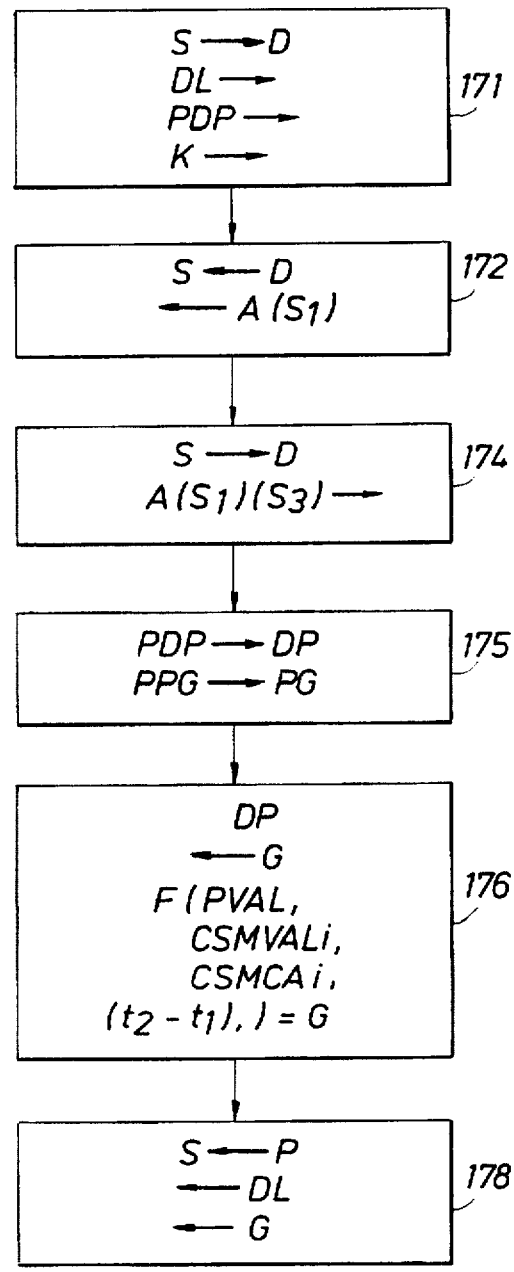
Figure 15:
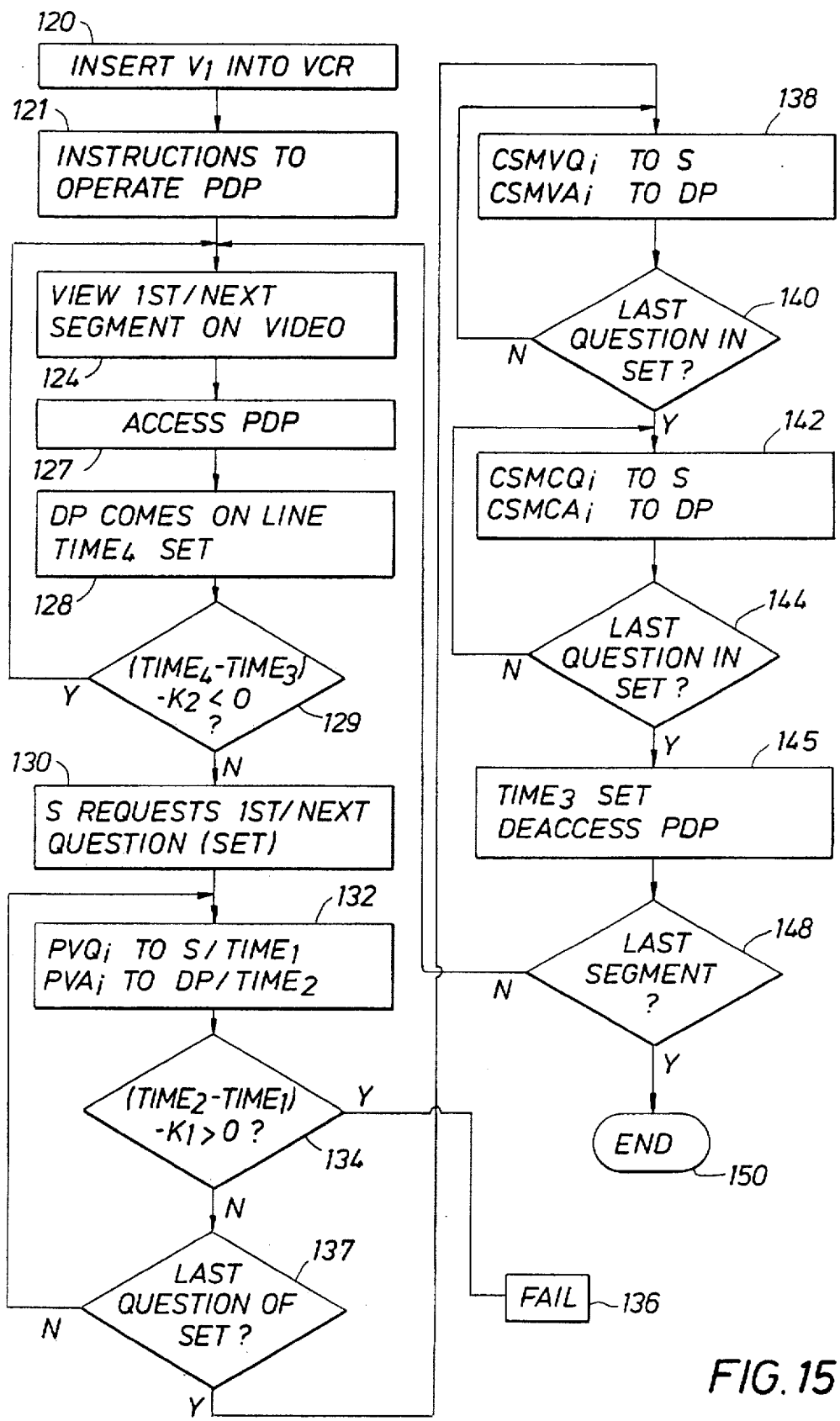

FIGS. 14, 15, and 16 illustrate that the method of procedure with the present alternate embodiment is virtually identical with the method of procedure with the embodiment of FIGS. 5, 6, and 7. In FIG. 14 the only difference is indicated by box 117. Box 117 indicates that at this point the portion PPG of program PG is loaded from central computer DP into the portable computer PDP. Box 109 indicates that the residential/business equipment that the student takes to the remote in-resident location includes a portable data processor. FIG. 15 is similar to FIG. 6 and its method. The exceptions are indicated by boxes 121, 127 and 145. In box 121 the student receives instructions in regard to operating the portable data processor as opposed to instructions on how to access the central data processor. Then, in operation, as indicated by box 127, the student accesses the portable data processor, and as indicated by box 145, the student deaccesses the portable data processor in lieu of accessing and deaccessing the central computer as in the prior embodiment. FIG. 16 illustrates that at check-in the student returns the portable data processor as the residential/business scale communication equipment, box 171. Box 175 indicates that the portable data processor PDP is connected with the central computer DP and the portion PPG of the program PG, now with the student's answers, is loaded back into the program resident in the central data processor.

In this embodiment the formula for grading remains in the program PG in the central data processor. The central data processor, after receiving portion PPG of program PG reloaded at check-in time, formulates the grade.

The foregoing disclosure and description of the invention are illustrative and explanatory thereof, and various changes in the size, shape, and materials, as well as in the details of the illustrated system may be made without departing from the spirit of the invention.

We claim:

1. A method for personal validation of a remote student comprising:

soliciting a first datum of information from a student by an equipment distributor at a first place and time;

communicating with at least one database, created by a person/agency independent of the equipment distributor before the step of soliciting, to determine an independent preexisting correlation of the first datum with at least one second datum of information contained in database;

formulating a question based upon the second datum;

communicating the question to a student at a second place and time;

receiving an answer to the question in a data processor;

predicting, based upon the answer, whether the student at the second place and time is the student at the first place and time.

2. The method of claim 1 wherein the first datum comprises a drivers license number.

3. The method of claim 1 wherein the at least one database comprises a motor vehicle registration database.

4. The method of claim 1 wherein the at least one database comprises a credit report database.

5. The method of claim 1 that includes correlating the first datum with a plurality of second data; formulating a plurality of personal validation questions; and communicating a plurality of personal validation questions.

6. The method of claim 1 that includes comparing the student appearance at the first place and time with a drivers license picture.

7. The method of claim 1 that includes comparing a signature of the student at the first place and time with a signature on a drivers license.

8. The method of claim 1 that includes checking out course material to a student at the first place and time; recording the student's signature; checking in course material from a student at the first place and at a third time; recording the return student's signature; and comparing an appearance and a signature of the student at the first time and at the third time with a picture and a signature on a drivers license.

9. The method of claim 1 that includes soliciting drivers license information from a student without permitting reference by the student to a drivers license and that includes comparing the information solicited with information on a drivers license.

10. The method of claim 1 wherein communicating the questions and receiving the answers is performed using a phone line, and that includes:

soliciting an in-resident phone number from the student at the first place and time; and checking the in-resident number against the phone line used.

11. The method of claim 1 wherein the communicating with at least one database utilizes a data processor.

12. The method of claim 1 wherein the communicating the question to a student utilizes a data processor.

13. The method of claim 1 wherein communicating the question to a student at a second place and time includes communicating from a program originating in a central data processor to portable residential/business scale terminal screen equipment, and wherein the question comprises a personal validation question.

14. The method of claim 13 that includes measuring an elapsed time between said communicating the question and said receiving an answer to the question and wherein said predicting is based on said elapsed time.

15. The method of claim 14 that includes deaccessing the program by the portable equipment and reaccessing the program by the portable equipment and wherein deaccessing the program after the communication of the question and before the receiving of an answer to the question causes communicating a second question upon reaccessing.

16. The method of claim 15 wherein said accessing includes using a phone line.

* * * * *